US006961102B2

(12) United States Patent
Kitada et al.

(10) Patent No.: US 6,961,102 B2
(45) Date of Patent: Nov. 1, 2005

(54) IMAGE DISPLAY DEVICE

(75) Inventors: Takaaki Kitada, Ooamishirasato (JP); Masaki Tsubokura, Mobara (JP); Yuji Azuma, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 142 days.

(21) Appl. No.: 10/678,177

(22) Filed: Oct. 6, 2003

(65) Prior Publication Data
US 2005/0073622 A1  Apr. 7, 2005

(30) Foreign Application Priority Data

Nov. 13, 2002 (JP) .............................. 2002-329131

(51) Int. Cl.[7] .......................................... G02F 1/1333
(52) U.S. Cl. ...................................................... 349/58
(58) Field of Search ........................... 349/58; 361/725

(56) References Cited

U.S. PATENT DOCUMENTS

| 6,411,353 B1 * | 6/2002 | Yarita et al. ................... 349/59 |
| 6,490,016 B1 * | 12/2002 | Koura ........................... 349/58 |
| 6,639,635 B2 * | 10/2003 | Wang ........................... 349/58 |
| 6,654,078 B1 * | 11/2003 | Kato et al. ..................... 349/58 |
| RE38,516 E * | 5/2004 | Hasegawa et al. ............. 349/58 |
| 2004/0141102 A1 * | 7/2004 | Lin ............................. 349/58 |

FOREIGN PATENT DOCUMENTS

| JP | 2001-33764 | 7/1999 |
| JP | 2002-55329 | 8/2000 |

* cited by examiner

Primary Examiner—James Dudek
(74) Attorney, Agent, or Firm—Reed Smith LLP; Stanley P. Fisher, Esq.; Juan Carlos A. Marquez, Esq.

(57) ABSTRACT

An image display device includes a display panel module, a middle frame which places the display panel module thereon, and an upper frame which is engaged with a side face of the middle frame in a state where the upper frame covers a periphery of the display panel module, wherein the engaging portion includes projecting portions on a side face of the middle frame, each projecting portion being smoothly raised in the direction opposite to the display panel module and forming a sharp stepped portion which follows a raised portion, and pawl portions which are formed on portions of the upper frame which face the projecting portions, the pawl portions being bent along side faces of the stepped portions of the projecting portions and, thereafter, being bent such that the pawl portions extend while having arcuate face which has a center thereof in the vicinity of bent portions.

4 Claims, 13 Drawing Sheets

BFR

PIT

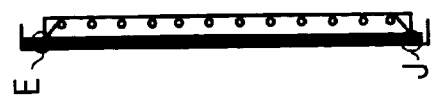
FIG. 11K
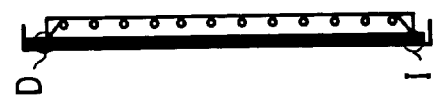
FIG. 11J
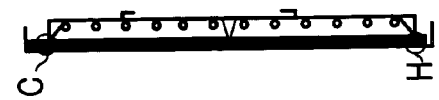
FIG. 11I
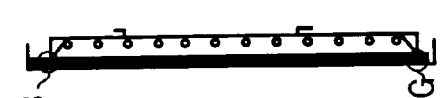
FIG. 11H
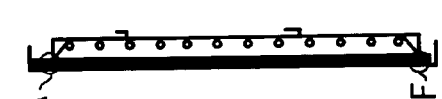
FIG. 11G
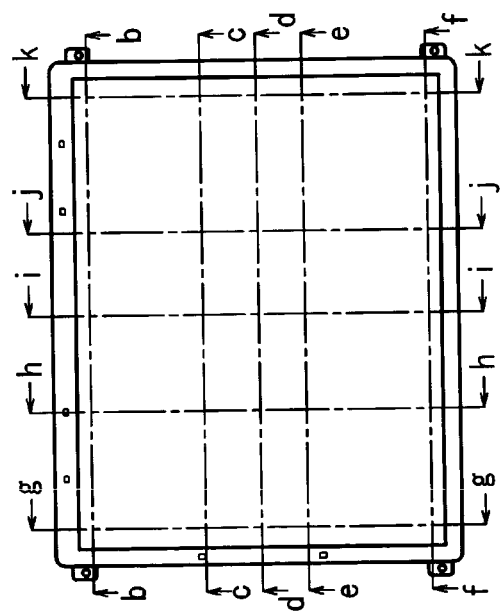
FIG. 11A
    
FIG. 11B  FIG. 11C  FIG. 11D  FIG. 11E  FIG. 11F

IMAGE DISPLAY DEVICE

BACKGROUND OF THE INVENTION

1. Field of the Invention

The present invention relates to an image display device, and more particularly to an image display device which forms an image display panel and the like into a module using a frame.

2. Description of the Related Art

A liquid crystal display device is, for example, configured such that a backlight unit is arranged on a back face of a liquid crystal display panel and these components are formed into a module using an upper frame, a lower frame and the like.

The upper frame constitutes a frame which covers a periphery of the liquid crystal display panel while exposing a liquid crystal display part of the liquid crystal display panel and engages with the lower frame (for example, see Japanese Unexamined Patent Publication 2001-33764, FIG. 2).

Further, the lower frame usually constitutes a portion of the backlight unit, wherein a plurality of fine line-shaped lamps and a reflector which reflects light from these lamps to the liquid crystal display panel side are provided in the inside of the lower frame which is formed in a box shape (for example, see Japanese Unexamined Patent Publication 2002-55329, FIG. 1 and FIG. 3).

SUMMARY OF THE INVENTION

However, with respect to the image display device having such a constitution, in engaging the upper frame and another frame with each other, these frames are configured to form holes in either one of engaging portions and hence, so called burrs are liable to be easily generated around these holes and there is many cases where these burrs are removed and give an adverse influence to an electronic circuit in the module.

Further, it is desirable that the lower frame which constitutes a portion of the backlight unit is formed in a shape which ensures the reliability in strength. In this case, however, a drawback that an illumination quantity of light from the lamps housed in the lower frame to the image display panel cannot be increased has been pointed out.

Further, it has been pointed out that due to the difference in thermal expansion coefficient between the image display panel and the frame on which the image display panel is placed while positioning the image display panel, the stress concentration is generated on a portion of the image display panel and this gives an adverse influence to the image display panel.

Still further, it has been pointed out that with respect to an image display panel (module) which is placed on a frame and mounts tape-carrier-type semiconductor devices between a printed circuit board and the image display panel, due to the difference in thermal expansion coefficient between the image display panel and the printed circuit board, a warp is generated in the semiconductor device and the semiconductor devices brought into contact with the upper frame, for example.

The present invention has been made in view of such circumstances and it is one of advantages of the present invention to provide an image display device which does not generate so-called burrs or cutting chips of the frame in engaging an upper frame with another frame.

Further, it is another advantage of the present invention to provide an image display device which can enhance the optical efficiency of lamps and can ensure the mechanical strength of a frame which houses these lamps.

Further, it is another advantage of the present invention to provide an image display device which can eliminate a drawback caused due to the difference in thermal expansion between an image display panel and a frame on which the image display panel is placed while positioning the image display panel.

Further, it is another advantage of the present invention to provide an image display device, wherein the image display device includes an image display panel (module) which is placed on a frame and mounts tape-carrier-method semiconductor devices between a printed circuit board and the image display panel, and can overcome a drawback caused by the difference in thermal expansion between the image display panel and the printed circuit board.

To briefly explain the summary of typical inventions among inventions disclosed in the present application, they are as follows.

(1)

An image display device according to the present invention, for example, includes an image display panel module, a middle frame which places the image display panel module thereon, and an upper frame which is engaged with a side face of the middle frame by way of an engaging portion in a state that the upper frame covers a periphery of the image display panel module, wherein the engaging portion includes projecting portions on a side face of the middle frame, the projecting portions being smoothly raised in the direction opposite to the image display panel module and forming a sharp stepped portion which follows a raised portion, and pawl portions which are formed on portions of the upper frame which face the projecting portions, the pawl portions being bent along side faces of the stepped portions of the projecting portions and, thereafter, being bent such that the pawl portions extend while having substantially arcuate curved faces which have one ends thereof in the vicinity of bent portions.

(2)

An image display device according to the present invention is, for example, on the premise of the constitution of means 1, characterized in that a curvature of the arcuate curved faces of the pawl portions of the upper frame which extends from the bent portions is set larger than a curvature of the projecting portions of the middle frame at the raised portions.

(3)

An image display device according to the present invention is, for example, on the premise of the constitution of means 1 or means 2, characterized in that the pawl portions of the upper frame are formed by press forming.

(4)

An image display device according to the present invention, for example, includes an image display panel module, a middle frame which places the image display panel module thereon, a lower frame which is fixed to the middle frame and incorporates a backlight therein, and an upper frame which is engaged with a side face of the middle frame by way of an engaging portion in a state that the upper frame covers a periphery of the image display panel module, wherein the engaging portion includes projecting portions on a side face of the middle frame, each projecting portion being smoothly raised in the direction opposite to the image display panel module and forming a sharp stepped portion which follows a raised portion, and pawl portions which are formed on portions of the upper frame which face the projecting portions, the pawl portions being bent along side faces of the stepped portions of the projecting portions and, thereafter, being bent such that the pawl portions extend while having substantially arcuate curved faces which have one ends thereof in the vicinity of bent portions, and a gap is defined between a back face of the middle frame on which the projecting portions are formed and the lower frame.

(5)

An image display device according to the present invention, for example, includes an image display panel, and a lower frame which is arranged on a back face of the image display panel in a state that the lower frame incorporates lamps therein, wherein the lower frame has at least respective sides thereof parallel to the longitudinal direction of the lamps bent toward the image display panel side at an angle of approximately 90°, cut-and-raised portions which are juxtaposed substantially parallel to and in the vicinity of respective sides of the lower frame are formed, and a reflector which is placed on the lower frame such that the reflector also covers the respective cut-and-raised portions is bent at respective sides thereof supported by the cut-and-raised portions at an angle equal or less than the angle of the bent portions of the lower frame.

(6)

An image display device according to the present invention is, for example, on the premise of the constitution of means 5, characterized in that holes which allow communication of air therethrough are formed in at least portions of respective sides of the reflector which are supported by the cut-and-raised portions and are not brought into contact with the cut-and-raised portions.

(7)

An image display device according to the present invention, for example, includes an image display panel, and a frame which places the image display panel thereon, wherein a projecting portion is formed on the frame and over a whole periphery of the image display panel such that the projecting portion surrounds the image display panel: and the distance to the projecting portion in respective corners of the image display panel is set larger than the distance to the projecting portion at portions other than the respective corner portions under an ordinary temperature.

(8)

An image display device according to the present invention, for example, includes an image display panel module which mounts a plurality of semiconductor devices formed by a tape carrier method thereon, and a frame on which the image display panel module is placed, wherein recessed portions are formed in the frame below the semiconductor devices which are arranged at least at one end side out of the plurality of juxtaposed semiconductor devices which are mounted on one side of the image display panel module.

The present invention is not limited to the above-mentioned constitutions and various modifications are conceivable without departing from the technical concept of the present invention.

BRIEF DESCRIPTION OF THE DRAWING

FIG. 11A to FIG. 11K are constitutional views showing other embodiments of the image display device according to the present invention;

DETAILED DESCRIPTION OF THE INVENTION

Hereinafter, embodiments of an image display device according to the present invention are explained in conjunction with attached drawings.

Embodiment 1.

Figure 1A:
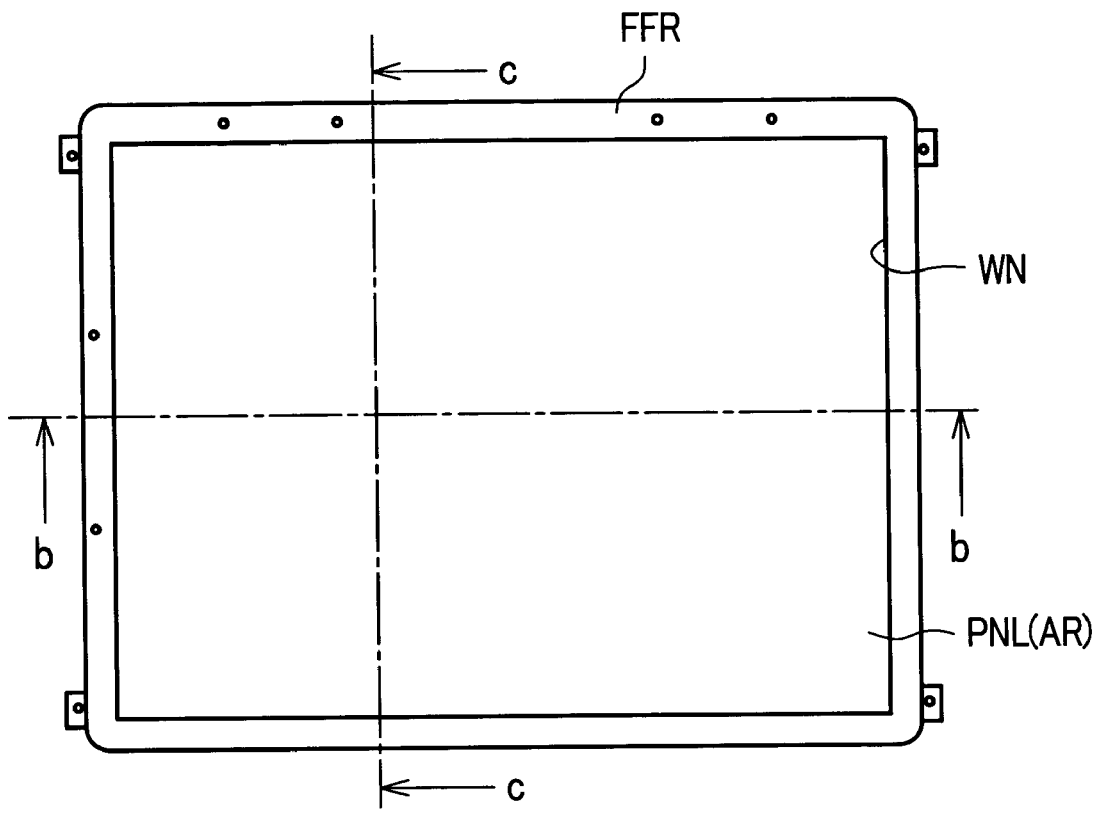
FIG. 1A to FIG. 1C are constitutional views showing one embodiment of a module of an image display device according to the present invention.

FIG. 1A is a view showing one embodiment of an image display device according to the present invention and is a front view of a liquid crystal display device formed in a module. Here, "front" means a face at a side which an observer observes an image. Further, FIG. 1B a cross-sectional view taken along a line b—b in FIG. 1A and FIG. 1C is a cross-sectional view taken along a line c—c in FIG. 1A.

In FIG. 1A, for example, there is provided an upper frame FFR which is made of metal. With respect to this upper frame FFR, a liquid crystal display part AR of a liquid crystal display panel PNL is exposed through an opening portion (window) WN formed in the upper frame FFR.

That is, the upper frame FFR covers a peripheral portion of the liquid crystal display panel PNL except for the above-mentioned liquid crystal display part AR and, at the same time, engages with a side face of a middle frame MFR described later on which the liquid crystal display panel PNL is mounted.

On a back face of the middle frame MFR, a box-like lower frame BFR is arranged. In the lower frame BFR, a plurality of cold cathode ray tubes BL, for example, which are arranged on an inner surface thereof at an equal interval and a reflector RFL which reflects light from the cold cathode ray tube BL toward the liquid crystal display panel PNL side are arranged. The lower frame BFR has a periphery thereof fixed to the middle frame MFR.

That is, the cold cathode ray tubes BL and the reflector RFL which include the lower frame BFR constitute a so-called backlight unit. Further, this arrangement also constitutes a so-called direct backlight in which the cold cathode ray tubes BL and the like are juxtaposed on a back face side of the liquid crystal display panel PNL.

Further, the box-like lower frame BFR is configured such that a diffusion plate or other optical sheet or the like, for example, can be placed thereon. These diffusion plate or other optical sheet and the like have peripheries thereof sandwiched by the lower frame BFR and the middle frame MFR.

Figure 2:
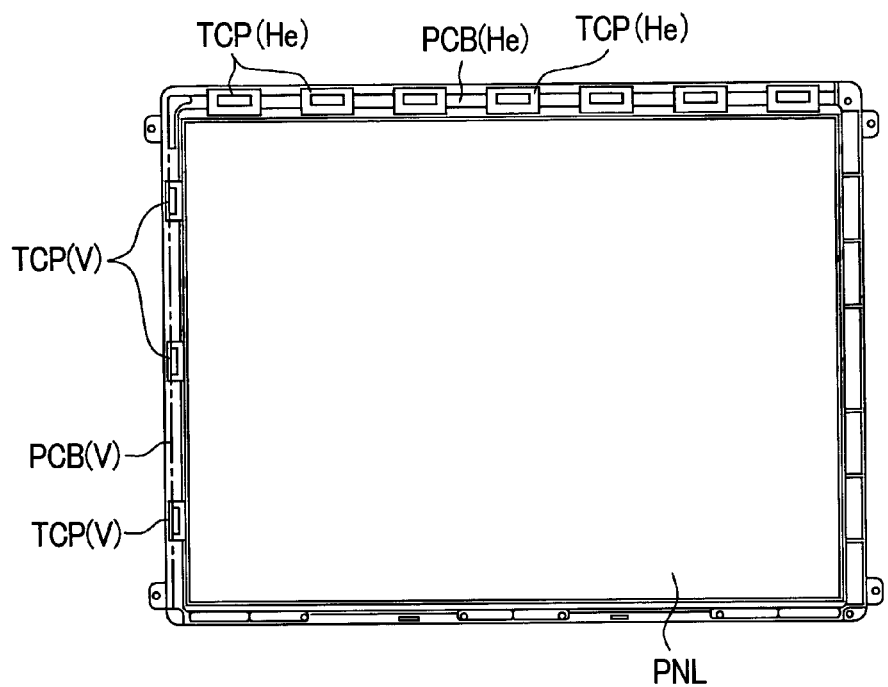
FIG. 2 is a view showing a plan when an upper frame is removed in the constitution shown in FIG. 1.

With respect to the plan view shown in FIG. 1A, FIG. 2 is a view showing a case in which the upper frame FFR is removed so that the liquid crystal display panel PNL is exposed.

The liquid crystal display panel PNL is constituted such that a pair of transparent substrates which are arranged to face each other by way of liquid crystal constitute an envelope and a large number of pixels are formed in a spreading direction of the liquid crystal. Here, a region defined by a mass of these pixels is referred to as the above-mentioned liquid crystal display part AR. Then, a scanning signal drive circuit V which is served for supplying so-called scanning signals to respective pixels is arranged at a left side portion in the drawing, for example, while a video signal drive circuit He which is served for supplying video signals is arranged at an upper side portion in the drawing.

The scanning signal drive circuit V is constituted of a plurality of semiconductor devices TCP (V) which are formed by a so-called tape carrier method, wherein one-end-sides of the semiconductor devices TCP (V) are connected to terminals of gate signal lines which are formed on a surface of one transparent substrate of the liquid crystal display panel PNL, while another end sides of the semiconductor devices TCP (V) are connected to a wiring layer formed on a printed circuit board PCB (V) which is arranged close to the liquid crystal display panel PNL. Here, the tape-carrier-method semiconductor device is configured such that a semiconductor chip is mounted on a flexible substrate and includes a terminal which is connected to a bump of the semiconductor chip on a face of the substrate.

In the same manner, the video signal drive circuit He is also constituted by a plurality of semiconductor devices TCP (He) which are formed by a tape carrier method, wherein one end sides of the semiconductor devices TCP (He) are connected to terminals of drain signal lines formed on a surface of another transparent substrate of the liquid crystal display panel PNL, while another end side of the semiconductor device TCP (He) is connected to a wiring layer which is formed on a surface of another printed circuit board PCB (He) which is arranged close to the liquid crystal display panel PNL.

Here, in this specification, the constitution which is formed into a module by connecting the above-mentioned semiconductor devices TCP (V), TCP (He) and the printed circuit boards PCB (V), PCB (He) to the liquid crystal display panel PNL may be referred to as a liquid crystal display panel module.

Figure 1B:
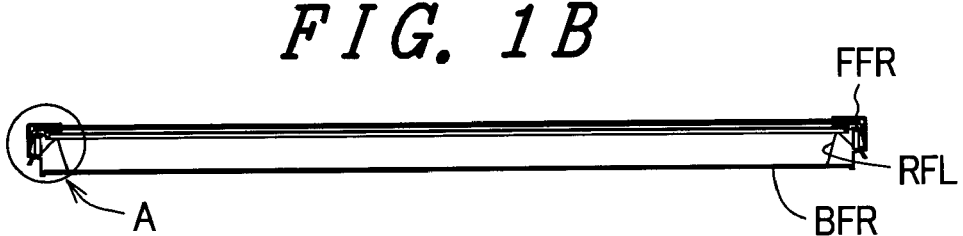
Figure 1C:
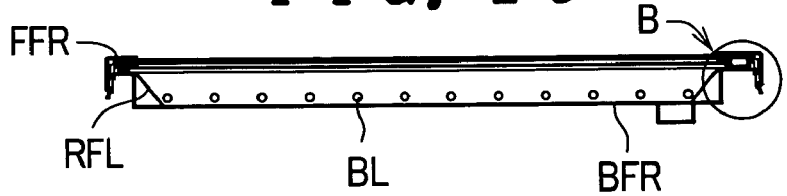
Figure 3A:
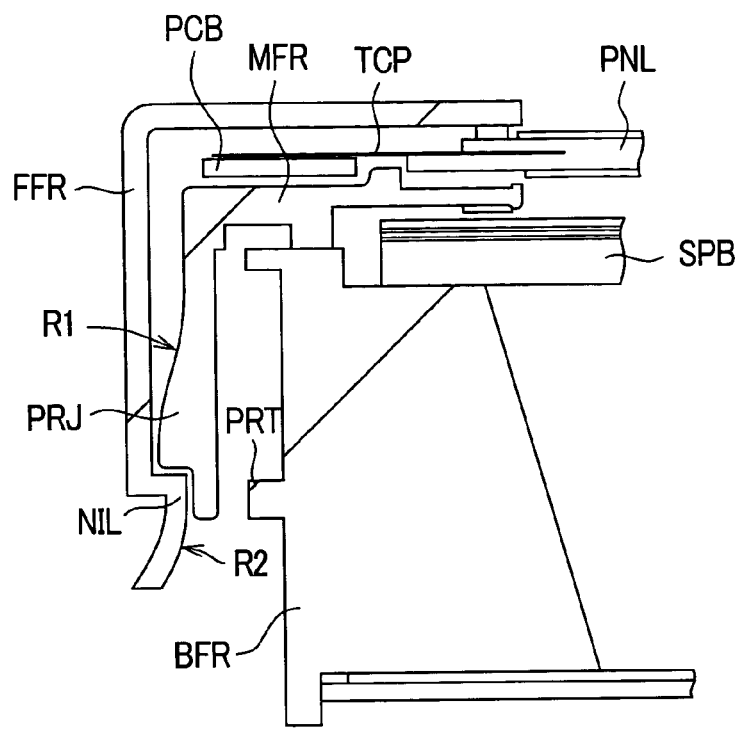
FIG. 3A and FIG. 3B are cross-sectional views showing the constitutions surrounded by circular frames in FIG. 1 in an enlarged manner.
Figure 3B:
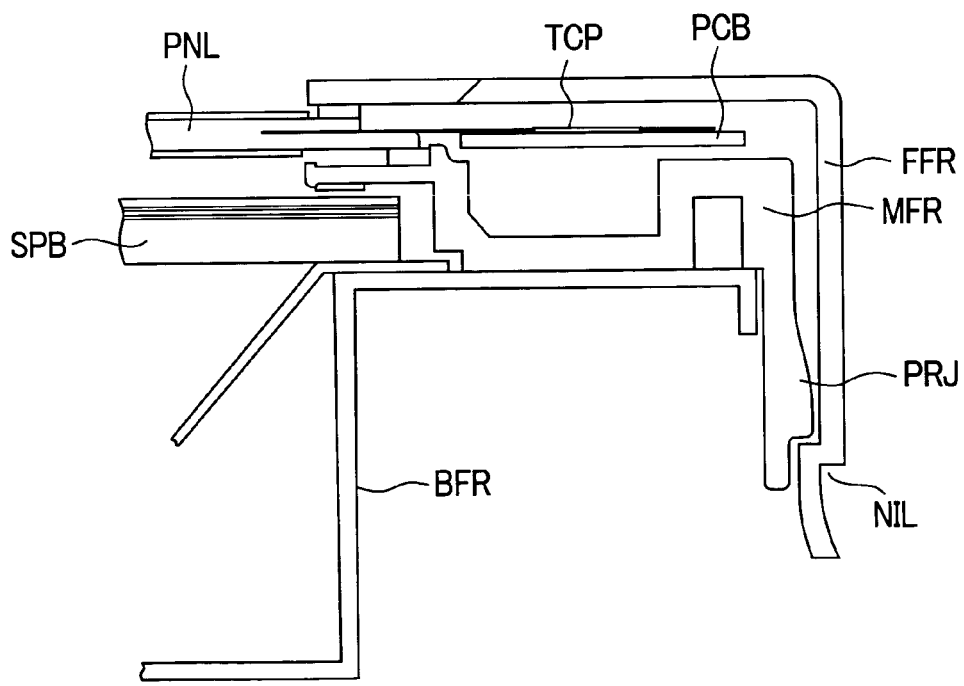

FIG. 3A is a view showing a portion in a circular frame A in FIG. 1B and FIG. 3B is a view showing a portion in a circular frame B in FIG. 1C in an enlarged manner. These drawings show a state in which the upper frame FFR engages with the middle frame MFR.

Here, the middle frame MFR is formed of a resin material, for example. The middle frame MFR constitutes a frame body which forms an opening at a portion thereof which faces the liquid crystal display part AR of the liquid crystal display panel PNL. The middle frame MFR includes a mounting portion on which the periphery of the liquid crystal display panel PNL, the semiconductor devices TCP which are connected to the peripheral portion of the liquid crystal display panel PNL and the printed circuit boards PCB which are connected to the semiconductor devices TCP are mounted and a side face portion which is integrally formed with the mounting portion and is bent to slightly cover a side face of the lower frame BFR to some extent.

The lower frame BFR mounts a diffusion plate SPB and, an optical sheet and the like which are arranged below the liquid crystal display panel PNL on a box-like side face portion thereof and, at the same time, these diffusion plate SPB and optical sheet and the like are pushed by an extension portion of the middle frame MFR.

Further, the upper frame FFR includes a portion which covers a periphery of the liquid crystal display panel PNL, the semiconductor devices TCP connected at this peripheral portion and a printed circuit board PCB connected to the semiconductor devices TCP while excluding the liquid crystal display part AR and a side face portion which is bent so as to cover the side face of the middle frame MFR together with the above-mentioned portion.

In such a constitution, first of all, projecting portions PRJ are formed at portions of the side face portion of the middle frame MFR. Each projecting portion PRJ is formed such that the projecting portion PRJ is smoothly raised along the direction opposite to the liquid crystal display part PNL side and, thereafter, sharply drops to form a stepped portion.

On the other hand, the upper frame FFR is formed by a press into a shape such that, at a sharp stepped portion of the projecting portion PRJ formed on the middle frame MFR, the upper frame FFR is bent along a side face of the stepped portion (first bent portion) and, thereafter, is bent while extending with an arcuate curved face having a center of curvature in the vicinity of the first bent portion (second bent portion). That is, the press-formed portion of the upper frame FFR is provided for functioning as a pawl portion NIL which is engaged with the projecting portion PRJ formed on the middle frame MFR.

Figure 4:
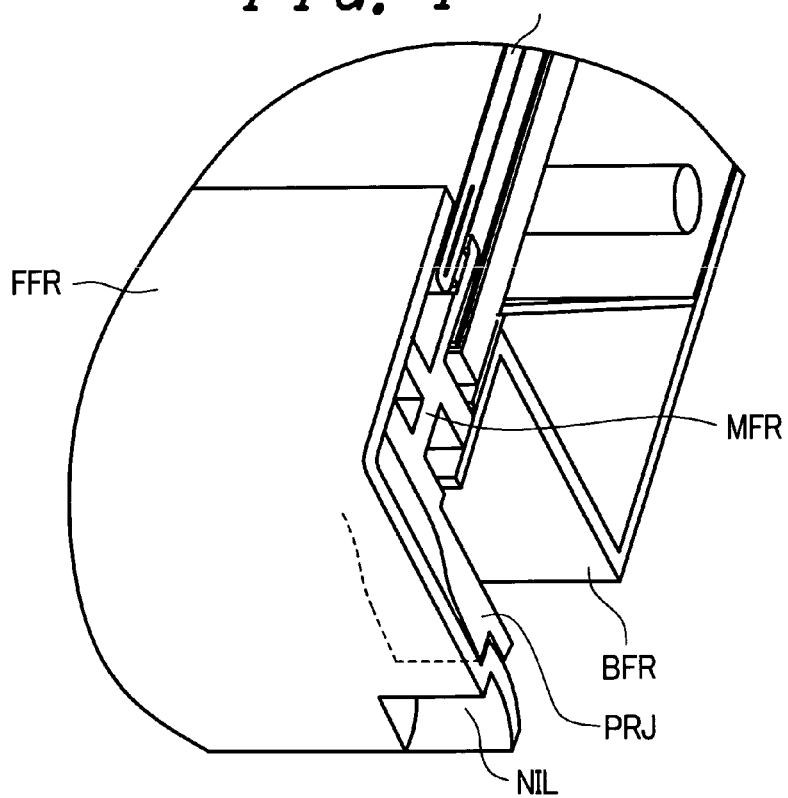
FIG. 4 is a perspective view with a part broken away of a portion of FIG. 3A as viewed from an oblique direction.

The projecting portion PRJ formed on the middle frame MFR is, as shown in the perspective view with a part broken away of FIG. 4, formed on a portion of the middle frame FMR. For example, one or more projecting portions PRJ are formed on each one of four sides of the middle frame MFR and the above-mentioned pawls NIL which are formed on the upper frame FFR are provided at positions corresponding to the projecting portions PRJ.

When the upper frame FFR is made to cover the middle frame MFR from above with such a constitution, the pawl portions NIL of the upper frame FFR slide on the surfaces of the projecting portions PRJ of the middle frame MFR while being in contact with such surfaces and finally are engaged with the sharp stepped portions of the projecting portions PRJ. In this case, the upper frame FFR formed of metal, for example, has resiliency at the pawl portions NIL and hence, the pawl portions NIL can easily get over the projecting portions PRJ due to the resiliency.

Here, by forming the pawl portions NIL of the upper frame FFR such that the curvature (indicated by R2 in FIG. 3A) of an arcuate side which extends from the second bent portion of the pawl portion NIL of the upper frame FFR is set larger than the curvature (indicated by R1 in FIG. 3A) of a bulged portion of the projecting portion PRJ of the middle frame MFR, the pawl portion NIL of the upper frame FFR which slides on the surface of the projecting portion PRJ of the middle frame MFR in a contact manner performs the slide movement along the arcuate side having the large curvature, there is no possibility that the pawl portion NIL cuts into the surface of the projecting portion PRJ. In view of the above, it is possible to have an advantageous effect that the generation of cutting chips from the middle frame MFR can be obviated.

Further, as shown in FIG. 3A, along an inner face of the portion of the middle frame MFR where the projecting portion PRJ is formed, the lower frame BFR is arranged. Here, the inner face and the lower frame BFR are spaced apart from each other with a slight gap therebetween.

Further, as shown in FIG. 3A, on a side face of the lower frame BFR which faces a lower end of an inner face of a portion of the middle frame MFR on which the projecting portion PRJ is formed, a protrusion PRT is formed. The protrusion PRT is formed such that the protrusion PRT is spaced apart from the inner face of the middle frame MFR with a slight distance held therebetween. Here, the protrusion PRT is formed for the purpose of forming a relatively large space portion below the protrusion PRT (at the bottom side of the lower frame BFR).

Due to such a constitution, after engaging the upper frame FFR with the middle frame MFR, it is possible to easily remove the upper frame FFR from the middle frame MFR.

Figure 5C:
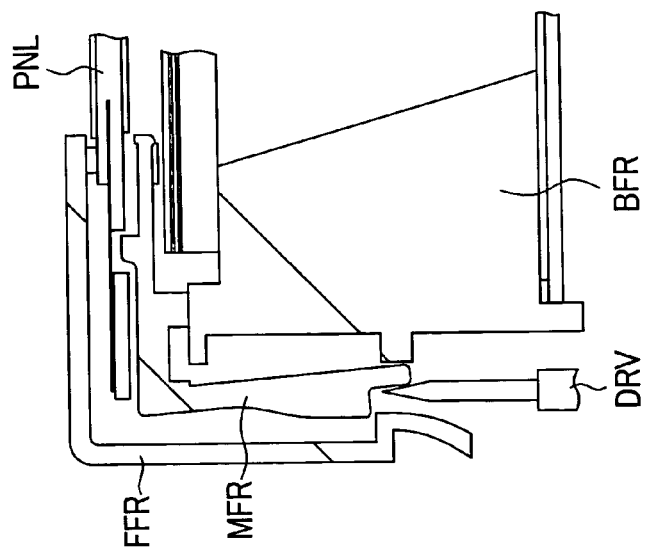
FIG. 5A to FIG. 5C are explanatory views showing an advantageous effect of the present invention.
Figure 5B:
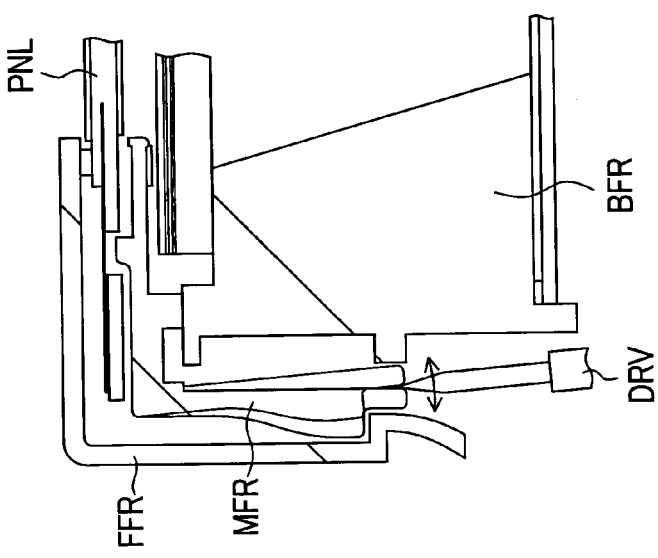
Figure 5A:
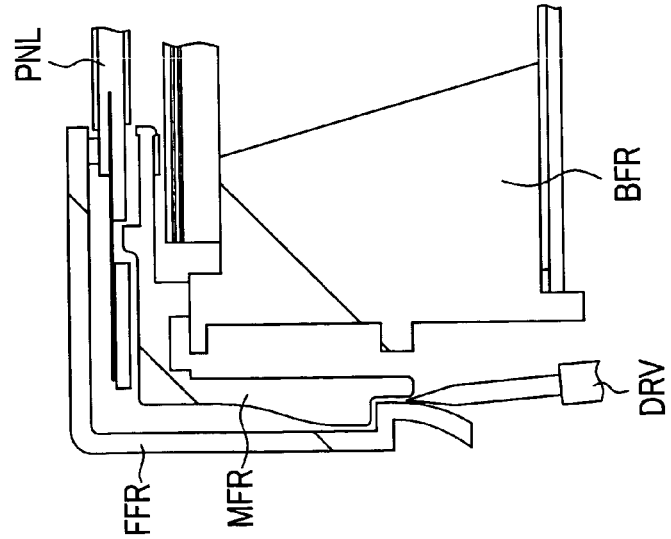

That is, as shown in FIG. 5A, a driver DRV, for example, is inserted into a gap defined between the middle frame MFR and the upper frame FFR at the engaging portion from the bottom side of the lower frame BFR. Next, as shown in FIG. 5B, the middle frame MFR is forcibly moved to the lower frame BFR side using the driver DRV. In this case, the middle frame MFR which is formed of a resin material, for example, can be relatively easily moved due to the resiliency thereof. Then, due to the presence of the space portion formed below the protrusion PRT, the driver DRV can be manipulated easily. Further, as shown in FIG. 5C, when the movement of the middle frame MFR is restricted by the protrusion PRT, the engagement of the projecting portion PRJ of the middle frame MFR with the pawl portion NIL of the upper frame FFR is released. By pulling the upper frame FFR upwardly in the drawing in this state, the upper frame FFR can be separated from the middle frame MFR.

Embodiment 2.

Figure 6A:
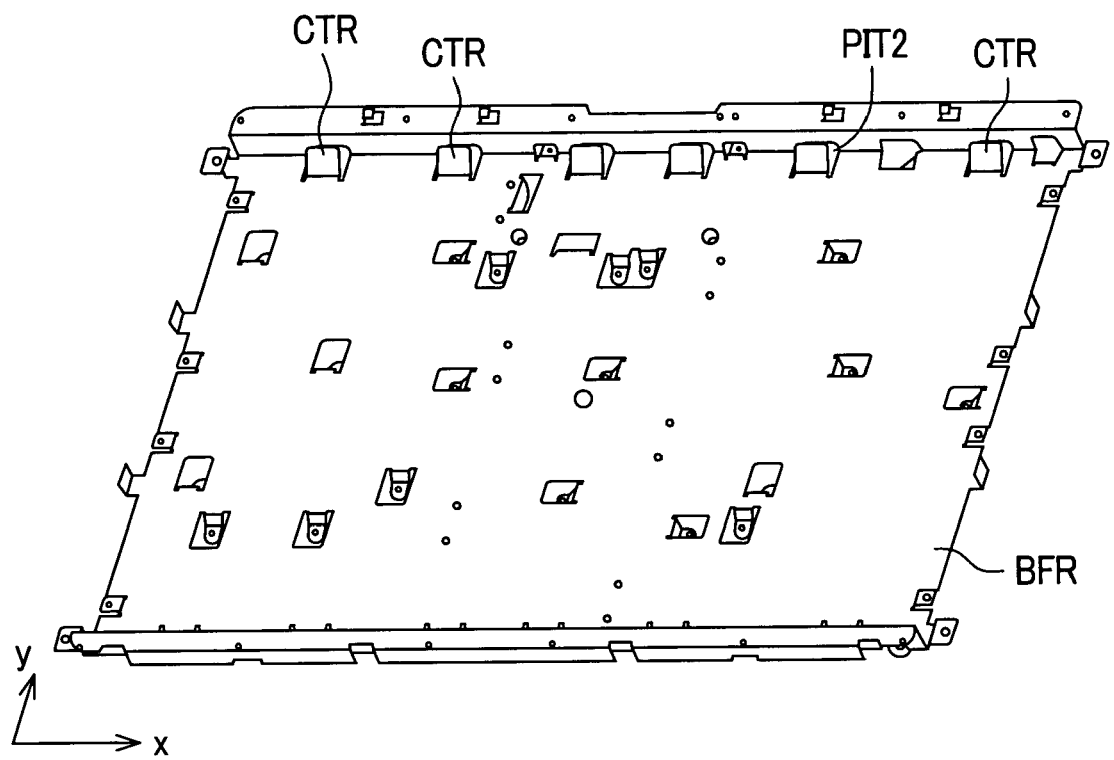
FIG. 6A and FIG. 6B are constitutional views showing one embodiment of a lower frame of the image display device according to the present invention.

FIG. 6A is a perspective view of the lower frame BFR which is incorporated into the lower frame BFR or is constituted as a portion of the lower frame BFR. In this embodiment, the lower frame BFR is constituted as the lower frame BFR.

Lamps (for example, cold cathode ray tubes or the like) not shown in the drawings are arranged such that a sheet-like reflector described later is placed on the lower frame BFR and, thereafter, the lamps (eight lamps, for example) which extend in the x direction and are juxtaposed in the y direction at a substantially equal interval are arranged.

The lower frame BFR has respective sides thereof which are disposed parallel to the x direction in the drawing bent toward the liquid crystal display module side by 90° to ensure a mechanical strength thereof. Further, the lower frame BFR has the sides thereof further bent by 90° to form flat faces. The middle frame MFR is placed on the flat faces.

Then, in view of the necessity of arranging the sheet-like reflector on the lower frame BFR, in portions of the bottom face of the lower frame BFR close to respective sides in the x direction in the drawing, a plurality of cut-and-raised portions CTR are juxtaposed in parallel to and along the respective sides at a substantially equal interval.

That is, each cut-and-raised portion CTR is formed by forming a notch in the bottom face of the lower frame BFR in a U-shape and by raising a side portion of a notched inside portion at an approximately 60°.

Figure 6B:
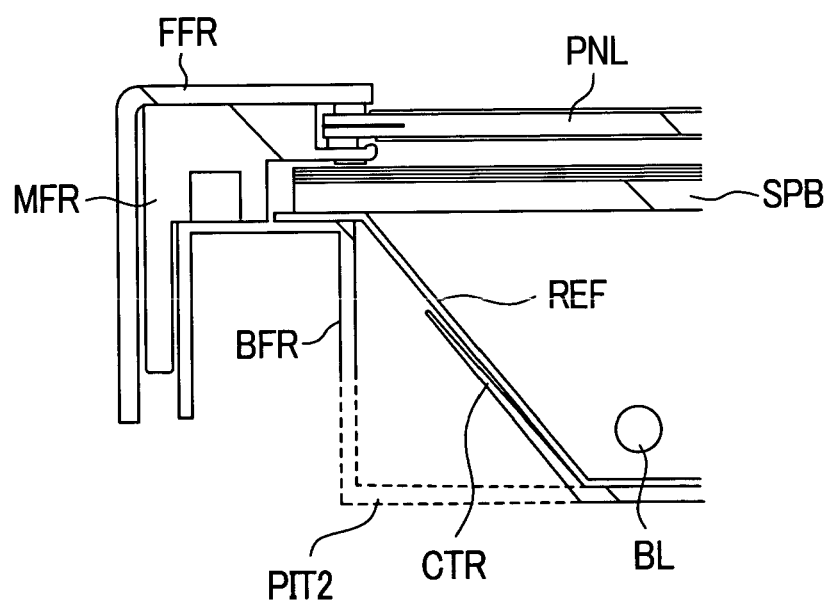

Due to such a constitution, an oblique face of each cut-and-raised portion CTR is directed toward the center side of the lower frame BFR. By arranging the sheet-like reflector on an upper face of the lower frame BFR such that the reflector also covers the cut-and-raised portions CTR, the sheet-like reflector can form a faces which are bent by 60° at side portions thereof which are parallel to the x direction. FIG. 6B is a cross-sectional view of the liquid crystal display device formed in a module, wherein a sheet-like reflector REF is formed on an upper face of the lower frame BFR and the sheet-like reflector REF is bent by the cut-and-raised portion CTR formed in the lower frame BFR thus forming a so-called "inversed trapezoidal shape".

Figure 7:
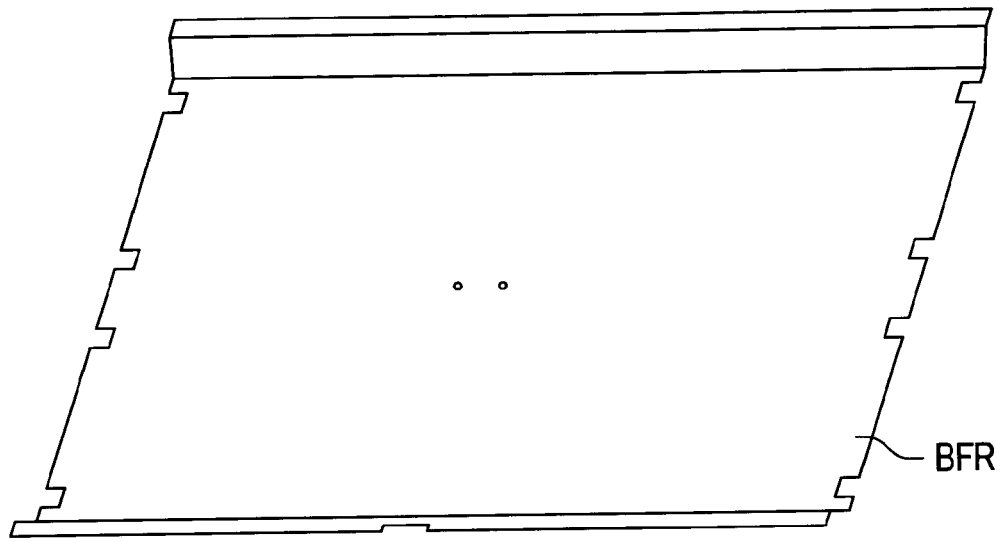
FIG. 7 is a constitutional view showing one embodiment of a sheet-like reflector of the image display device according to the present invention.

FIG. 7 is a perspective view showing only the sheet-like reflector REF which is bent by the cut-and-raised portions CTR formed in the lower frame BFR.

With the use of the faces of the sheet-like reflector REF which are bent by approximately 60°, light emitted from the lamp BL are directed to the center side of the lower frame BFR and eventually to the liquid crystal display panel PNL side so as to realize the effective use of the light.

Here, even when the lower frame BFR per se is bent by approximately 60° at the side portions thereof parallel to the x direction, the similar advantageous effect can be obtained. In this case, however, there arises a drawback that it is difficult for the lower frame BFR to ensure the sufficient mechanical strength.

Accordingly, the lower frame BFR described in this embodiment can effectively make use of the light while ensuring the mechanical strength.

Figure 8A:
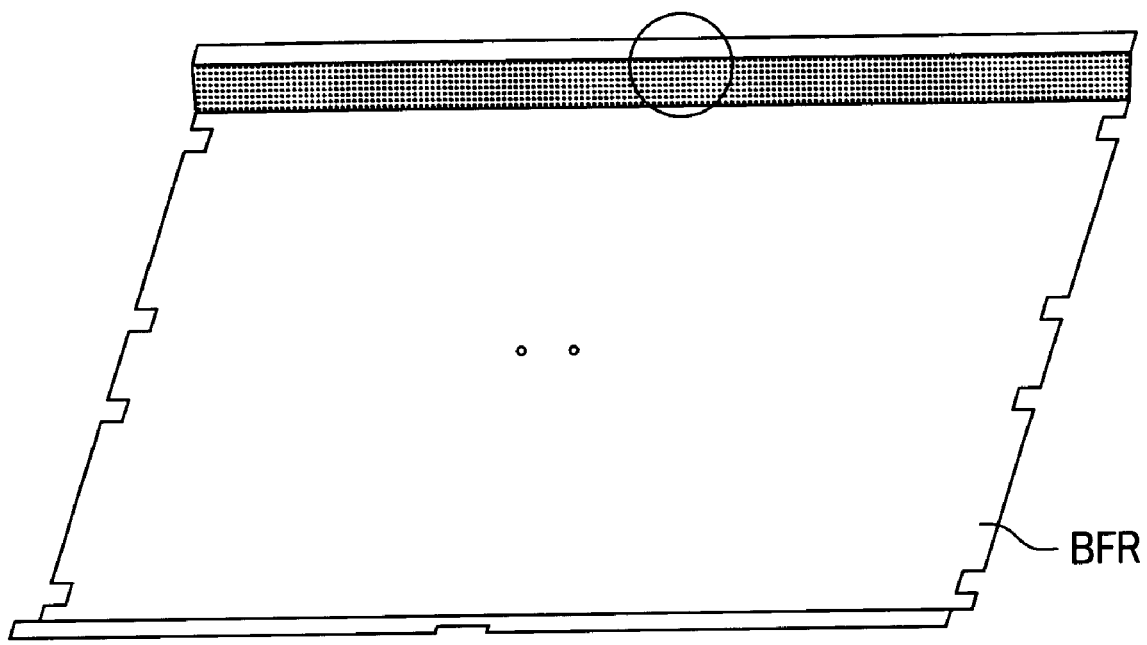
FIG. 8A and FIG. 8B are constitutional views showing another embodiment of the sheet-like reflector of the image display device according to the present invention.

FIG. 8A is a perspective view showing another embodiment of the sheet-like reflector REF having the above-mentioned constitution and corresponds to FIG. 7.

Figure 8B:
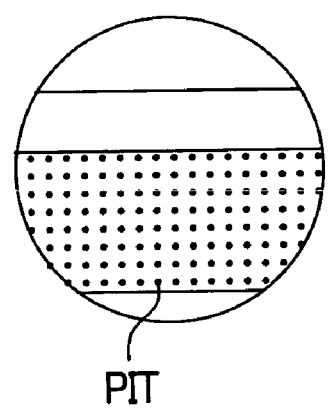

The constitution which makes this embodiment different from the embodiment shown in FIG. 7 lies in that, with respect to the sheet-like reflector REF, in the bent portions supported by the cut-and-raised portions CTR, a large number of minute holes PIT are formed as shown in FIG. 8A and FIG. 8B. That is, the reflector REF is configured to have both of a function of reflecting light and a function of communicating air at these portions.

The inside of the lower frame BFR in which lamps BL are arranged is liable to easily accumulate heat and there may arise a drawback that the light emitting efficiency of the lamps BL is lowered. In view of the above, this embodiment is configured such that the convection of air in the inside of the lower frame BFR can be easily generated through the large number of holes PIT which are formed in the above-mentioned sheet-like reflector REF and holes PIT2 (see FIG. 6) which are formed in the lower frame BFR when the cut-and-raised portions are formed.

In view of the above, it is unnecessary to form the holes PIT in the whole area of the bent portions of the sheet-like reflector REF and it is sufficient to form the holes PIT in portions which are not directly brought into contact with the above-mentioned cut-and-raised portions CTR. Although the holes may be formed in portions which are directly brought into contact with the cut-and-raised portions CTR, these holes do not function as air communicating holes which contribute to the convection of air.

Further, although a raising angle of the cut-and-raised portions CTR is set to approximately 60°, it is needless to say that any raising angle can be selected provided that the angle is set smaller than an angle of the bent portions of the side of the lower frame BFR corresponding to the cut-and-raised portions CTR. Further, it is not always necessary to set an angle of the bent portion of the lower frame BFR to 90° and the angle may be less than 90° or more than 90° provided that the mechanical strength is ensured.

Embodiment 3.

Figure 9:
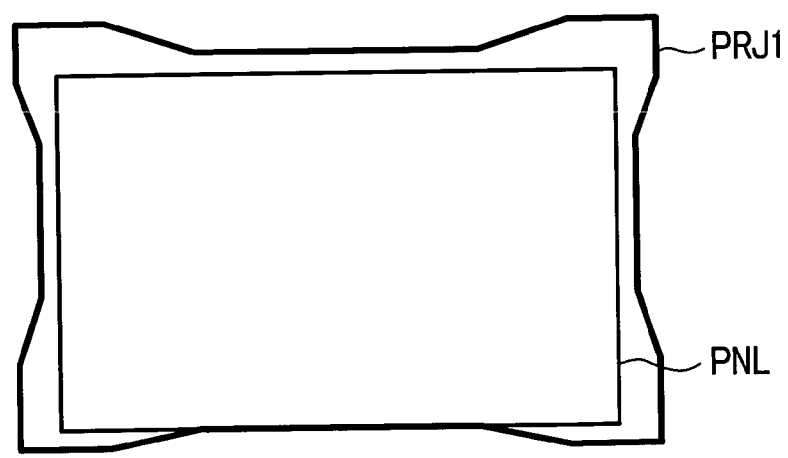
FIG. 9 is a plan view showing one embodiment of a projecting portion for positioning a liquid crystal display panel in a middle frame of the image display device according to the present invention.

FIG. 9 is a plan view showing a state in which a liquid crystal display panel module PNLM which is placed on an upper face of the middle frame MFR is positioned using a projecting portion PRJ1 formed on the upper surface of the middle frame MFR.

The projecting portion PRJ1 is formed around the whole periphery of the liquid crystal display panel PNL such that the projecting portion PRJ1 surrounds the liquid crystal display panel PNL. The projecting portion PRJ1 is provided for preventing the intrusion of dust from the outside.

Here, since the structure which the projecting portion PRJ1 surrounds is the liquid crystal display panel PNL, the semiconductor devices TCP and the printed circuit boards PCB which are connected to the liquid crystal display panel PNL are arranged on the projecting portion PRJ1.

Further, this projecting portion PRJ1 also has a function of supporting the upper frame FFR, wherein the projecting portions PRJ1 uniformly supports the upper frame FFR so as to prevent the concentration of force of the upper frame FFR to the liquid crystal display panel PNL.

Then, in this embodiment, at respective corner portions of the liquid crystal display panel module PNLM, the projecting portion PRJ1 is formed with a relatively large distance compared to portions other than corners.

At an ordinary temperature, the projecting portion PRJ1 is not formed in a closely contact manner with the liquid crystal display panel module PNL but is formed in a slightly spaced-apart manner from the liquid crystal display panel module PNL. This provision is made taking the difference in thermal expansion rate between the liquid crystal display panel module PNLM and the middle frame MFR into consideration.

However, at respective corner portions of the liquid crystal display panel module PNLM, respective corner portions are liable to easily interfere with the projecting portion PRJ1 due to the difference in thermal expansion between the middle frame MFR and the liquid crystal display panel module PNLM and hence, the concentration of stress is generated on the liquid crystal display panel module PNLM through these interfering portions.

Here, as mentioned above, the distance to the projecting portion PRJ1 in respective corner portions of the liquid crystal display panel module PNLM is set larger than the distance to the projecting portion PRJ1 at portions other than the corner portions under an ordinary temperature.

Due to such a constitution, it is possible to obviate the concentration of stress to the liquid crystal display panel module PNLM caused by the difference in thermal expansion and, at the same time, it is possible to achieve accurate positioning of the liquid crystal display panel module PNLM with respect to the middle frame MFR.

Here, FIG. 1A to FIG. 11K are views showing one embodiment of the liquid crystal display device to which the above-mentioned respective embodiments are applied, wherein FIG. 11A is a plan view and FIG. 11B to FIG. 11K are respective cross-sectional views taken along a line b—b to a line k—k in FIG. 11A.

Further, enlarged views of the inside of a circular frame A shown in FIG. 11G, a circular frame B shown in FIG. 11H, a circular frame C shown in FIG. 11I, a circular frame D shown in FIG. 11J and a circular frame E shown in FIG. 11K are respectively shown in FIG. 12A, FIG. 12B, FIG. 12C, FIG. 12D and FIG. 12E.

Further, enlarged views of the inside of a circular frame F shown in FIG. 11G, a circular frame G shown in FIG. 11H, a circular frame H shown in FIG. 11I, a circular frame I shown in FIG. 11J and a circular frame J shown in FIG. 11K are respectively shown in FIG. 13A, FIG. 13B, FIG. 13C, FIG. 13D and FIG. 13E.

Further, enlarged views of the inside of a circular frame K shown in FIG. 11B, a circular frame L shown in FIG. 11C, a circular frame M shown in FIG. 11D, a circular frame N shown in FIG. 11E and a circular frame O shown in FIG. 11F are respectively shown in FIG. 14A, FIG. 14B, FIG. 14C, FIG. 14D and FIG. 14E.

Further, enlarged views of the inside of a circular frame P shown in FIG. 11B, a circular frame Q shown in FIG. 1C, a circular frame R shown in FIG. 11D, a circular frame S shown in FIG. 11E and a circular frame T shown in FIG. 11F are respectively shown in FIG. 15A, FIG. 15B, FIG. 15C, FIG. 15D and FIG. 15E.

Embodiment 4.

Figure 10A:
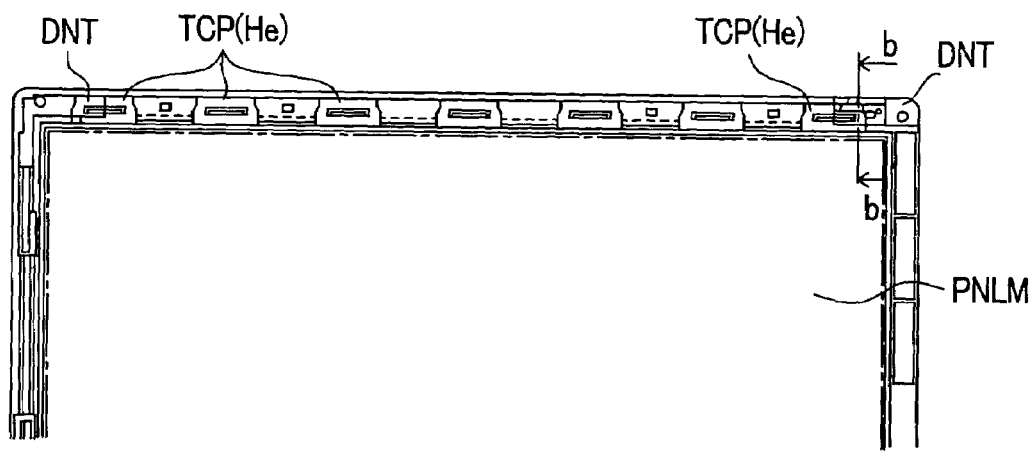
FIG. 10A and FIG. 10B are constitutional views showing one embodiment of a recessed portion formed in the middle frame of the image display device according to the present invention.

FIG. 10A is a plan view showing a liquid crystal display panel module PNLM placed on a middle frame MFR.

Here, out of respective semiconductor devices TCP (He) of a video signal drive circuit He mounted on the liquid crystal display panel module PNLM, below the respective semiconductor devices arranged at both ends of the liquid crystal display panel module PNLM, recessed portions DNT are formed in the middle frame MFR.

Figure 10B:
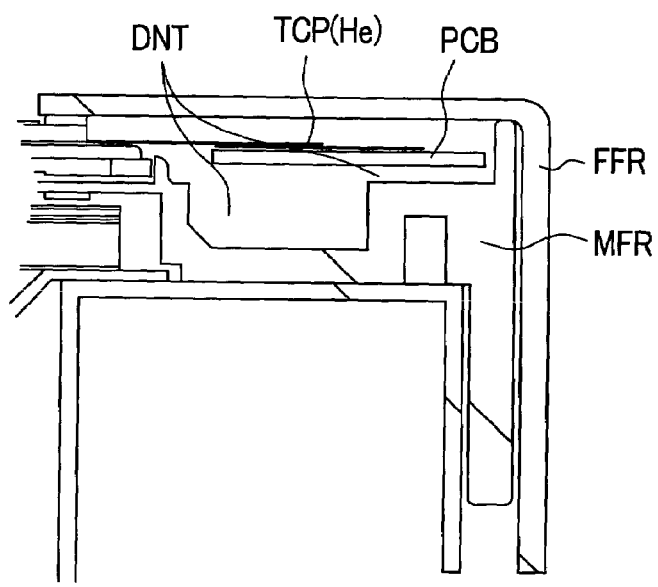
Figure 12A:
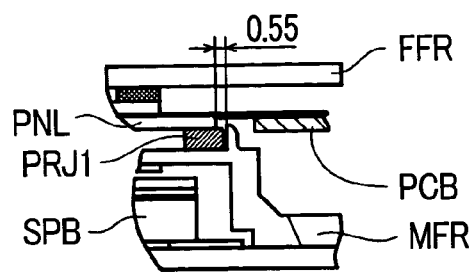
FIG. 12A to FIG. 12E are enlarged views showing the constitutions within a circular frame A, a circular frame B, a circular frame C, a circular frame D and a circular frame E shown in FIG. 11.
Figure 12B:
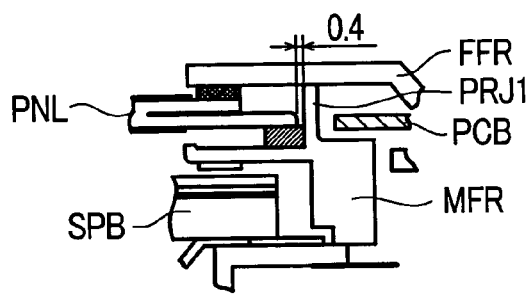
Figure 12C:
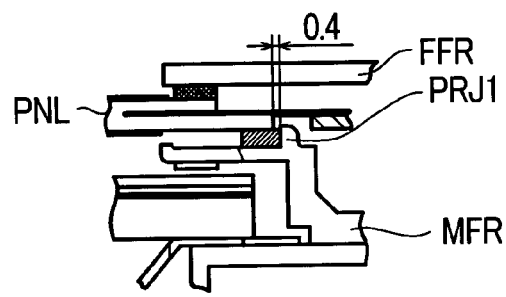
Figure 12D:
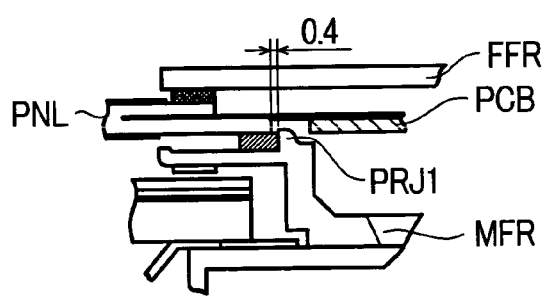
Figure 12E:
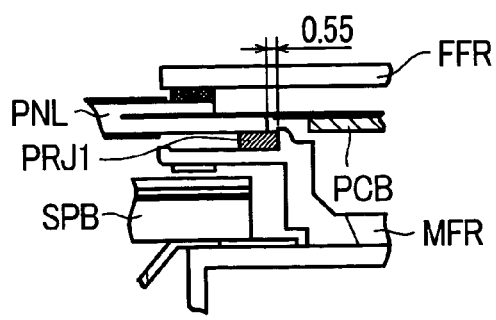
Figure 13A:
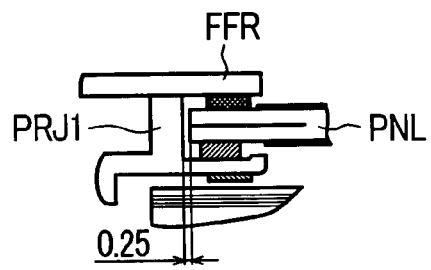
FIG. 13A to FIG. 13E are enlarged views showing the constitutions within a circular frame F, a circular frame G, a circular frame H, a circular frame I and a circular frame J shown in FIG. 11.
Figure 13B:
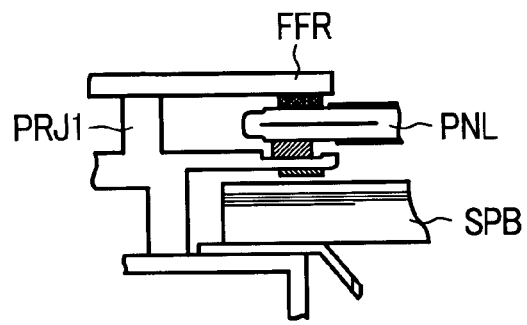
Figure 13C:
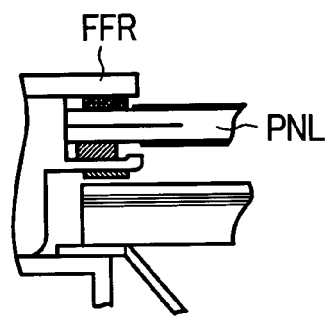
Figure 13D:
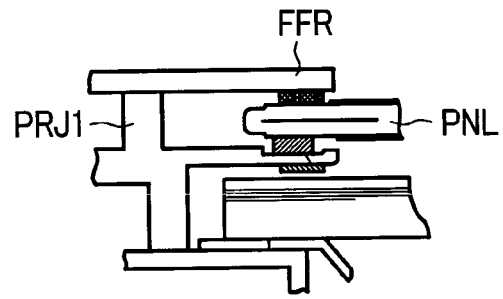
Figure 13E:
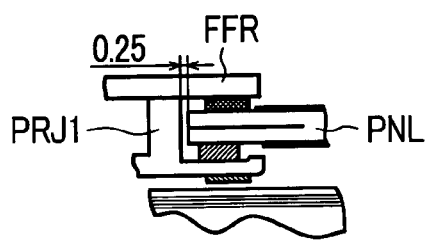
Figure 14A:
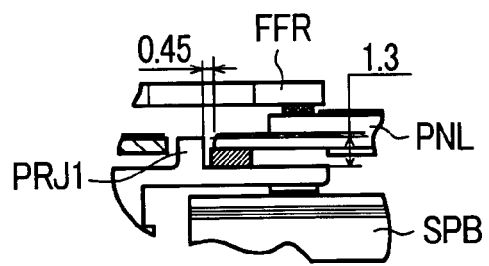
FIG. 14A to FIG. 14E are enlarged views showing the constitutions within a circular frame K, a circular frame L, a circular frame M, a circular frame N and a circular frame O shown in FIG. 11.
Figure 14B:
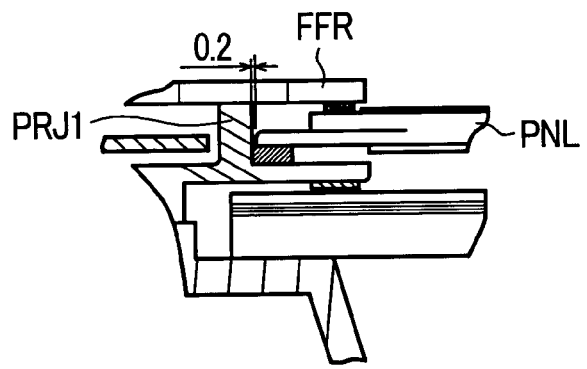
Figure 14C:
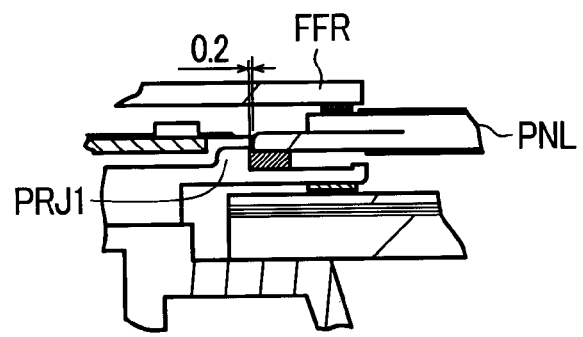
Figure 14D:
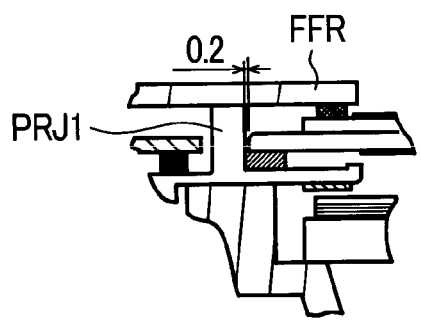
Figure 14E:
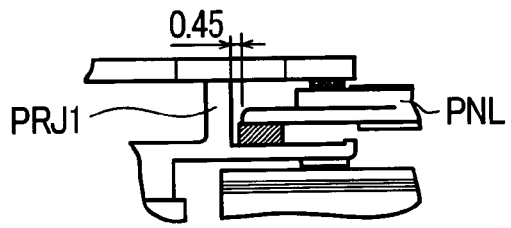
Figure 15A:
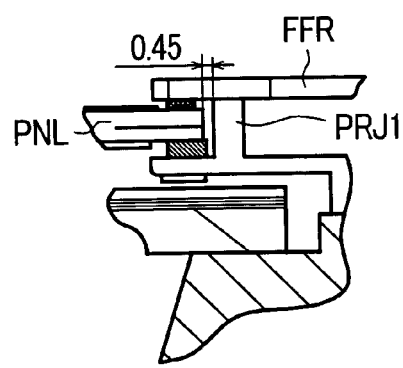
FIG. 15A to FIG. 15E are enlarged views showing the constitutions within a circular frame P, a circular frame Q, a circular frame R, a circular frame S and a circular frame T shown in FIG. 11.
Figure 15B:
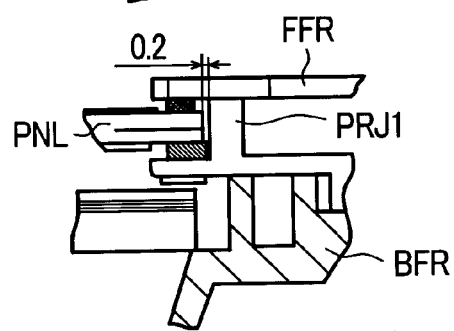
Figure 15C:
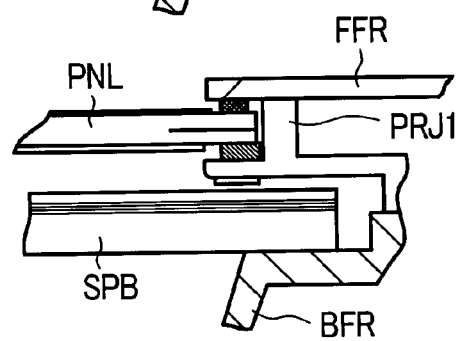
Figure 15D:
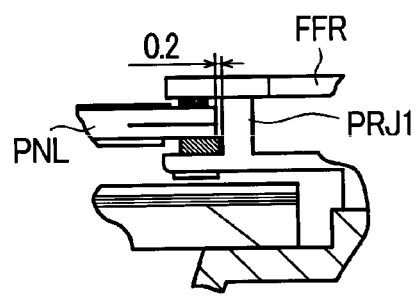
Figure 15E:
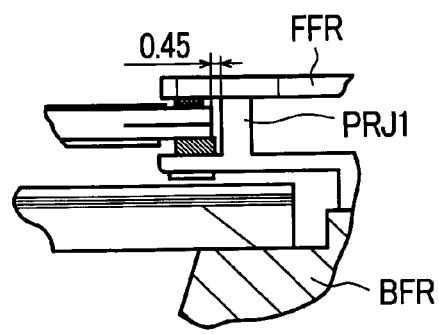

FIG. 10B is a cross-sectional view taken along a line b—b in FIG. 10A, wherein the recessed portions DNT are formed in parts of portions of the middle frame MFR which face the semiconductor devices TCP (He).

Here, the recessed portion means a portion which has a depth with respect to a periphery thereof. Accordingly, the recessed portion in this embodiment is a concept which also includes a hole formed in a middle frame having a relatively small thickness.

In this case, it is not always necessary to form the recessed portions DNT formed in the middle frame MFR below the semiconductor devices TCP (He) over the whole area of the semiconductor devices TCP (He). That is, the recessed portions DNT may be formed at portions of the semiconductor devices TCP (He). This is because that the middle frame MFR also has a function of supporting the semiconductor devices TCP (He).

Due to such a constitution, it is possible to obtain a following advantageous effect. That is, due to the difference in thermal expansion rate between the liquid crystal display panel PNL and the printed circuit board PCB, a large warp is liable to easily occur with respect to the semiconductor devices TCP (He) which are arranged at the both sides out of the respective semiconductor devices TCP (He) which are arranged in parallel. However, the warp can be released by the recessed portions DNT and hence, the interference of the semiconductor devices TCP (He) with the upper frame FFR, for example, can be prevented and the disconnection of wiring in the inside of the semiconductor devices TCP (He) can be prevented.

In this embodiment, out of the respective semiconductor devices TCP (He) of the video signal drive circuit He, below the respective semiconductor devices TCP (He) which are arranged at both ends, the recessed portions DNT are formed in the middle frame MFR. However, it is needless to say that the similar advantageous effect can be obtained by forming the recessed portion DNT in one of these semiconductor devices TCP (He).

Further, in this embodiment, the recessed portions DNT are formed in the middle frame MFR at the side where the video signal drive circuit He is formed. However, it is needless to say that the similar recessed portions DNT may be also formed in the middle frame MFR at the side where a scanning signal drive circuit V is formed.

The above-mentioned respective embodiments can be used in a single form or in combination. This is because that the advantageous effects of the respective embodiments can be obtained in a single form or in a synergistic manner.

Here, although the above-mentioned respective embodiments are explained with respect to the liquid crystal display device, it is needless to say that the respective embodiments are also applicable to an organic EL display device, for example.

As can be clearly understood from the foregoing explanation, according to the image display device of the present invention, in engaging the upper frame with another frame, it is possible to obviate the generation of so-called burrs of the frame or cutting chips.

Further, it is possible to ensure the mechanical strength of the frame which houses the lamps while enhancing the optical efficiency of the lamps.

Further, it is possible to solve the drawback caused by the difference in thermal expansion between the liquid crystal display panel and the frame which is mounted on the liquid crystal display panel for also performing positioning of the liquid crystal display panel.

Still further, the present invention provides the image display device which can overcome the drawback caused by the difference in thermal expansion between the liquid crystal display panel and the printed circuit board in the liquid crystal display panel (module) which is mounted on the frame and mounts tape-carrier-method semiconductor devices between the printed circuit board and the liquid crystal display panel.

What is claimed is:

1. An image display device comprising:
   an image display panel module;
   a middle frame which places the image display panel module thereon; and
   an upper frame which is engaged with a side face of the middle frame by way of an engaging portion in a state that the upper frame covers a periphery of the image display panel module, wherein
   the engaging portion includes projecting portions on a side face of the middle frame, the projecting portions being smoothly raised in the direction opposite to the image display panel module and forming a sharp stepped portion which follows a raised portion, and pawl portions which are formed on portions of the upper frame which face the projecting portions, the pawl portions being bent along side faces of the stepped portions of the projecting portions and, thereafter, being bent such that the pawl portions extend while having substantially arcuate curved faces which have one ends thereof in the vicinity of bent portions.

2. An image display device according to claim 1, wherein a curvature of the arcuate curved faces of the pawl portions of the upper frame which extends from the bent portions is set larger than a curvature of the projecting portions of the middle frame at the raised portions.

3. An image display device according to claim 1 or 2, wherein the pawl portions of the upper frame are formed by press forming.

4. An image display device comprising:
   an image display panel module;
   a middle frame which places the image display panel module thereon;
   a lower frame which is fixed to the middle frame and incorporates a backlight therein; and
   an upper frame which is engaged with a side face of the middle frame by way of an engaging portion in a state that the upper frame covers a periphery of the image display panel module, wherein
   the engaging portion includes projecting portions on a side face of the middle frame, the projecting portions being smoothly raised in the direction opposite to the image display panel module and forming a sharp stepped portion which follows a raised portion, and pawl portions which are formed on portions of the upper frame which face the projecting portions, the pawl portions being bent along side faces of the stepped portions of the projecting portions and, thereafter, being bent such that the pawl portions extend while having substantially arcuate curved faces which have one ends thereof in the vicinity of bent portions, and
   a gap is defined between a back face of the middle frame on which the projecting portions are formed and the lower frame.

* * * * *